(12) United States Patent
Xu et al.

(10) Patent No.: US 12,114,344 B2
(45) Date of Patent: Oct. 8, 2024

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Jing Xu, Dongguan (CN); Yanan Lin, Dongguan (CN)

(73) Assignee: Guangdong OPPO Mobile Telecommunications Corp., Ltd., Dongguan (CN)

( * ) Notice: Subject to any disclaimer, the term of this patent is extended or adjusted under 35 U.S.C. 154(b) by 397 days.

(21) Appl. No.: 17/548,215

(22) Filed: Dec. 10, 2021

(65) Prior Publication Data

US 2022/0104212 A1 Mar. 31, 2022

Related U.S. Application Data

(63) Continuation of application No. PCT/CN2019/101652, filed on Aug. 20, 2019.

(51) Int. Cl.
*H04W 72/10* (2009.01)
*H04W 72/0446* (2023.01)
(Continued)

(52) U.S. Cl.
CPC ....... *H04W 72/56* (2023.01); *H04W 72/0446* (2013.01); *H04W 72/20* (2023.01)

(58) Field of Classification Search
CPC . H04W 72/0446; H04W 72/20; H04W 72/51; H04W 72/56
USPC ........................................................ 370/329
See application file for complete search history.

(56) References Cited

U.S. PATENT DOCUMENTS

2017/0231011 A1 8/2017 Park et al.
2018/0070341 A1 3/2018 Islam et al.
(Continued)

FOREIGN PATENT DOCUMENTS

| CN | 108633031 A | 10/2018 |
|---|---|---|
| CN | 109644451 A | 4/2019 |
| CN | 109963335 A | 7/2019 |
| EP | 3457801 A1 | 3/2019 |

(Continued)

OTHER PUBLICATIONS

First Examination Report dated May 19, 2022 received in India Patent Application No. IN 202127061844. Translation included.

(Continued)

*Primary Examiner* — Robert J Lopata
(74) *Attorney, Agent, or Firm* — Sheppard, Mullin, Richter & Hampton LLP

(57) ABSTRACT

The embodiments of the present disclosure relate to a data transmission method, a terminal device, and a network device. The method includes: receiving, by a terminal device, first downlink information and second downlink information transmitted by a network device, the first downlink information having a time domain position earlier than a time domain position of the second downlink information, and first uplink information corresponding to the first downlink information having a time domain position later than a time domain position of second uplink information corresponding to the second downlink information; and determining, by the terminal device, to process first data corresponding to the first downlink information and/or second data corresponding to the second downlink information, and transmitting the first uplink information and/or the second uplink information to the network device based on a result of the processing.

14 Claims, 4 Drawing Sheets

(51) Int. Cl.
*H04W 72/20* (2023.01)
*H04W 72/56* (2023.01)

(56) References Cited

U.S. PATENT DOCUMENTS

| | | | |
|---|---|---|---|
| 2020/0053765 A1* | 2/2020 | Chien | H04L 1/1861 |
| 2020/0127788 A1* | 4/2020 | Wu | H04L 5/0053 |
| 2021/0051704 A1* | 2/2021 | Yang | H04W 72/20 |
| 2022/0116952 A1* | 4/2022 | Lee | H04L 5/0053 |
| 2022/0174669 A1* | 6/2022 | Yang | H04W 72/569 |
| 2022/0303063 A1* | 9/2022 | Mu | H04L 1/1854 |

FOREIGN PATENT DOCUMENTS

| | | | |
|---|---|---|---|
| EP | 3735071 A1 | 11/2020 | |
| WO | 2018129325 A1 | 7/2018 | |
| WO | 2018177363 A1 | 10/2018 | |
| WO | 2019137245 A1 | 7/2019 | |
| WO | 2019137245 A8 | 7/2019 | |

OTHER PUBLICATIONS

Extended European Search Report dated Jun. 1, 2022 received in European Patent Application No. EP 19942270.0.
International Search Report and Written Opinion dated May 20, 2020 in International Application No. PCT/CN2019/101652. English translation is attached.
LG Electronics. "Discussion on multiplexing of eMBB and URLLC", 3GPP TSG RAN WG1 NR Ad-hoc Meeting, R1-1700512, Jan. 20, 2017, Section 2, 10 pages.

\* cited by examiner

DATA TRANSMISSION METHOD, TERMINAL DEVICE, AND NETWORK DEVICE

CROSS-REFERENCE TO RELATED APPLICATIONS

The present application is a continuation of International Application No. PCT/CN2019/101652 filed on Aug. 20, 2019, which is hereby incorporated by reference in its entirety.

TECHNICAL FIELD

The present disclosure relates to communication technology, and more particularly, to a data transmission method, a terminal device, and a network device

BACKGROUND

In the New Radio (NR) system, there are two services, Ultra-Reliable Low Latency (URLLC) and Enhanced Mobile Broadband (eMBB), with different scheduling timings. The eMBB transmission is not sensitive to delay requirements, and therefore the interval between data transmission and detection feedback, or the interval between scheduling signaling and data transmission, can be configured to be relatively large. However, the URLLC transmission is delay-sensitive, and therefore the interval between data transmission and detection feedback, or the interval between scheduling signaling and data transmission, is typically configured to be relatively small.

Terminal devices adopt single-process, sequential processing. That is, a terminal device has to complete processing of one data service before it can process the next data service. Therefore, when the terminal device is processing an eMBB service transmission, the terminal device will not be configured with any URLLC transmission. As a result, the URLLC service may not to be scheduled or transmitted in time, which increases the transmission delay of the URLLC service.

SUMMARY

The embodiments of the present disclosure provide a data transmission method, a terminal device, and a network device, capable of improving transmission efficiency of low latency services.

In a first aspect, a data transmission method is provided. The method includes: receiving, by a terminal device, first downlink information and second downlink information transmitted by a network device, the first downlink information having a time domain position earlier than a time domain position of the second downlink information, and first uplink information corresponding to the first downlink information having a time domain position later than a time domain position of second uplink information corresponding to the second downlink information; and determining, by the terminal device, to process first data corresponding to the first downlink information and/or second data corresponding to the second downlink information, and transmitting the first uplink information and/or the second uplink information to the network device based on a result of the processing.

In a second aspect, a data transmission method is provided. The method includes: transmitting, by a network device, first downlink information and second downlink information to a terminal device, the first downlink information having a time domain position earlier than a time domain position of the second downlink information, and first uplink information corresponding to the first downlink information having a time domain position later than a time domain position of second uplink information corresponding to the second downlink information; and determining, by the network device, whether to receive the first uplink information and/or the second uplink information transmitted by the terminal device.

In a third aspect, a terminal device is provided. The terminal device is configured to perform the method according to the above first aspect or any implementation thereof. In particular, the terminal device includes one or more functional modules for performing the method according to the above first aspect or any implementation thereof.

In a fourth aspect, a network device is provided. The network device is configured to perform the method according to the above second aspect or any implementation thereof. In particular, the network device includes one or more functional modules for performing the method according to the above second aspect or any implementation thereof.

In a fifth aspect, a terminal device is provided. The terminal device includes a processor and a memory. The memory is configured to store a computer program, and the processor is configured to invoke and execute the computer program stored in the memory to perform the method according to the above first aspect or any implementation thereof.

In a sixth aspect, a network device is provided. The network device includes a processor and a memory. The memory is configured to store a computer program, and the processor is configured to invoke and execute the computer program stored in the memory to perform the method according to the above second aspect or any implementation thereof.

In a seventh aspect, a chip is provided. The chip is configured to perform the method according to any of the above first and second aspects or any implementation thereof. In particular, the chip includes a processor configured to invoke and execute a computer program from a memory, to cause a device provided with the chip to perform the method according to any of the above first and second aspects or any implementation thereof.

In an eighth aspect, a computer-readable storage medium is provided. The computer-readable storage medium is configured to store a computer program that causes a computer to perform the method according to any of the above first and second aspects or any implementation thereof.

In a ninth aspect, a computer program product is provided. The computer program product includes computer program instructions that cause a computer to perform the method according to any of the above first and second aspects or any implementation thereof.

In a tenth aspect, a computer program is provided. The computer program, when executed on a computer, causes the computer to perform the method according to any of the above first and second aspects or any implementation thereof.

With the above solutions, for some uplink or downlink data transmission process (e.g., Physical Downlink Shared Channel (PDSCH) or Physical Uplink Shared Channel (PUSCH)), its corresponding processing time interval is typically much larger than a processing time of a terminal device which is corresponding to a specific processing capability. For example, there may be typically redundant, idle time within the processing time interval for PDSCH/PUSCH corresponding to an eMBB service. Thus, other data, such as a delay-sensitive URLLC service, can be processed within the time interval. In this way, the low-latency scheduling requirements can be satisfied without significantly increasing the complexity of the terminal device.

DESCRIPTION OF EMBODIMENTS

The technical solutions in the embodiments of the present disclosure will be described below with reference to the figures in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The technical solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Universal Mobile Telecommunication System (UMTS), Worldwide Interoperability for Microwave Access (WiMAX) communication system, or the $5^{th}$ Generation (5G) communication system.

Figure 1:
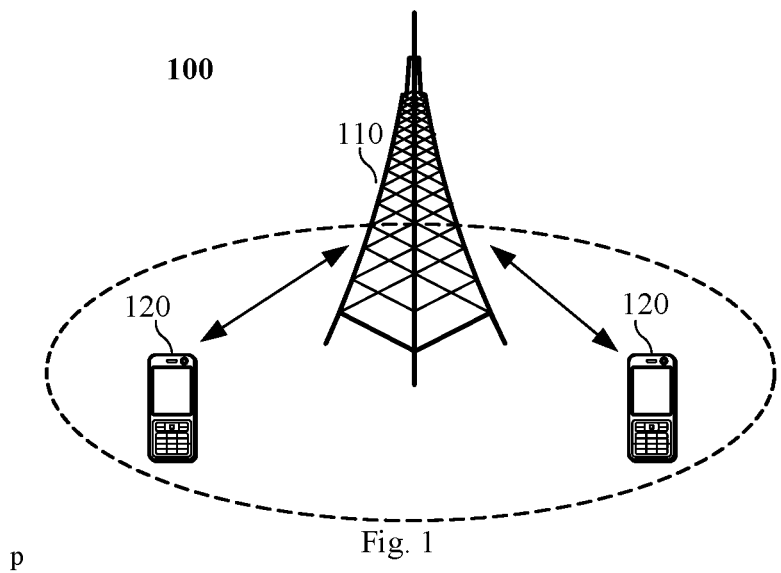
FIG. 1 is a schematic diagram showing a communication system architecture according to an embodiment of the present disclosure.

A communication system 100 where an embodiment of the present disclosure can be applied is illustratively shown in FIG. 1. The communication system 100 may include a network device 110. The network device 110 may be a device that can communicate with a terminal device (or referred to as communication terminal or terminal) 120. The network device 110 may provide communication coverage for a particular geographic area, and may communicate with terminal devices located in the coverage area. Optionally, the network device 110 may be a base station such as Base Transceiver Station (BTS) in a GSM system or a CDMA system, a base station such as NodeB (NB) in a WCDMA system, a base station such as Evolutional Node (eNB or eNodeB) in an LTE system, or a radio controller in a Cloud Radio Access Network (CRAN). Alternatively, the network device may be a mobile switch center, a relay station, an access point, a vehicle-mounted device, a wearable device, a hub, a switch, a network bridge, a router, a network side device in a 5G network, or a network device in a future evolved Public Land Mobile Network (PLMN).

The communication system 100 further includes at least one terminal device 120 located within the coverage of the network device 110. As used herein, the term "terminal device" may include, but not limited to, an apparatus connected via a wired line, e.g., via a Public Switched Telephone Network (PSTN), a Digital Subscriber Line (DSL), a digital cable, or a direct cable connection, and/or via another data connection/network, and/or via a wireless interface, e.g., for a cellular network, a Wireless Local Area Network (WLAN), a digital TV network such as a DVB-H network, a satellite network, an Amplitude Modulation (AM)-Frequency Modulation (FM) broadcast transmitter, and/or another terminal device, and configured to receive/transmit communication signals, and/or an Internet of Things (IoT) device. A terminal device configured to communicate via a wireless interface may be referred to as a "wireless communication terminal", a "wireless terminal", or a "mobile terminal". Examples of the mobile terminal may include, but not limited to, a satellite or cellular phone, a Personal Communications System (PCS) terminal combining cellular radio phone with data processing, fax, and data communication capabilities, a PDA including a radio phone, a pager, Internet/intranet access, a Web browser, a memo pad, a calendar, and/or a Global Positioning System (GPS) receiver, or a conventional laptop and/or palmtop receiver or another electronic device including a radio telephone transceiver. The terminal device may be an access terminal, a User Equipment (UE), a user unit, a user station, a mobile station, a mobile device, a remote station, a remote terminal, a mobile device, a user terminal, a terminal, a wireless communication device, a user agent, or a user device. Alternatively, the access terminal can be a cellular phone, a cordless phone, a Session Initiation Protocol (SIP) phone, a Wireless Local Loop (WLL) station, a Personal Digital Assistant (PDA), a handheld device or a computing device having a wireless communication function, another processing device connected to a wireless modem, a vehicle-mounted device, a wearable device, a terminal device in a 5G network, or a terminal devices in a future evolved PLMN, etc.

Optionally, direct communication, such as Device to Device (D2D) communication, may be performed between the terminal devices 120.

Optionally, the 5G system or network may also be referred to as a New Radio (NR) system or network.

FIG. 1 exemplarily shows one network device and two terminal devices. Optionally, the communication system 100 may include a plurality of network devices and the coverage of each network device may include a different number of terminal devices. The embodiment of the present disclosure is not limited to any of these examples.

Optionally, the communication system 100 may further include other network entities such as a network controller and a mobility management entity, and the embodiment of the present disclosure is not limited to any of these examples.

It can be appreciated that, in the embodiment of the present disclosure, a device with a communication function in a network/system may be referred to as a communication device. For the communication system 100 shown in FIG. 1 as an example, communication devices may include the network device 110 and the terminal devices 120, each having a communication function. The network device 110 and the terminal devices 120 may be e.g., any of the specific devices described above, and details thereof will be omitted here. The communication device may also include other devices in the communication system 100, such as a network controller, a mobility management entity, and other network entities, and the embodiment of the present disclosure is not limited to any of these examples.

It is to be noted that the terms "system" and "network" are often used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

In the NR system, there are two services, URLLC and eMBB, with different scheduling timings. The eMBB transmission is not sensitive to delay requirements, and therefore the interval between data transmission and detection feedback, or the interval between scheduling signaling and data transmission, can be configured to be relatively large. However, the URLLC transmission is delay-sensitive, and therefore the interval between data transmission and detection feedback, or the interval between scheduling signaling and data transmission, is typically configured to be relatively small.

Figure 2:
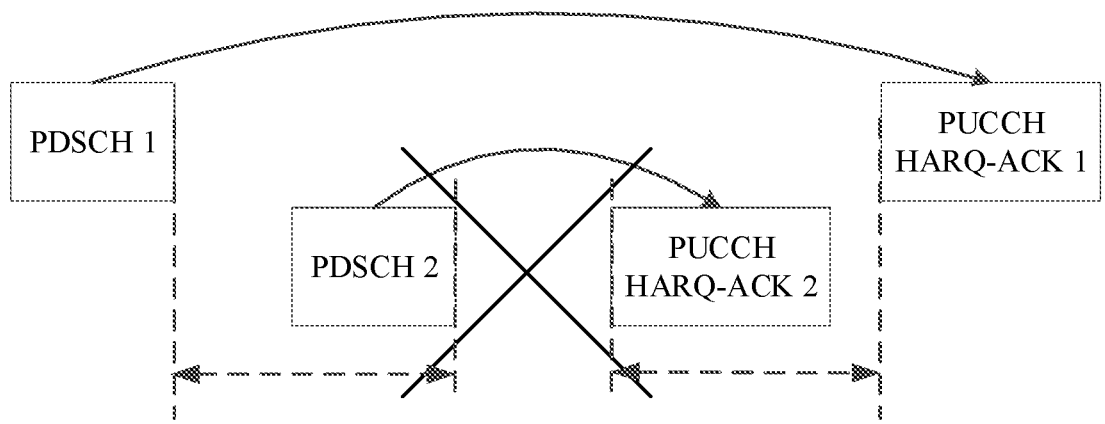
FIG. 2 is a schematic diagram showing data transmission and detection feedback according to an embodiment of the present disclosure.

For example, FIG. 2 shows a schematic diagram of data transmission and detection feedback. As shown in FIG. 2, a Physical Downlink Shared Channel (PDSCH) is used for downlink data transmission between a network device and a terminal device. For example, the data in PDSCH 1 in FIG. 2 may be for an eMBB service, and the data in PDSCH 2 may be for a URLLC service. Correspondingly, a Physical Uplink Control Channel (PUCCH) transmitted by the terminal device is used to carry a Hybrid Automatic Repeat reQuest (HARD) Acknowledgement (ACK) to feed back a reception status of the PDSCH to the network device. For example, HARQ-ACK 1 in FIG. 2 is used to feed back a reception status of PDSCH 1, and HARQ-ACK 2 is used to feed back a reception status of PDSCH 2. As shown in FIG. 2, since the eMBB service transmission is not sensitive to delay requirements, the time interval between PDSCH 1 and HARQ-ACK 1 can be relatively large, while the URLLC service transmission is sensitive to delay requirements, and accordingly the time interval between PDSCH 2 and HARQ-ACK 2 is relatively small.

Figure 3:
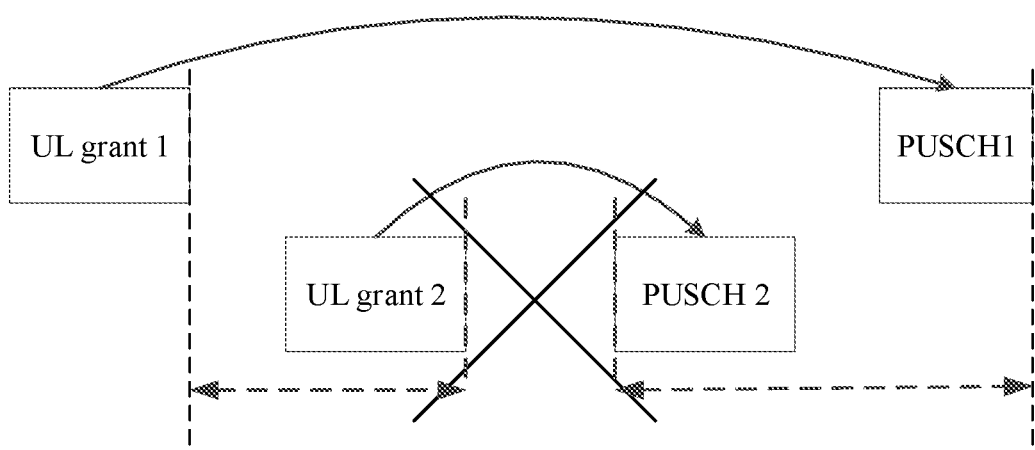
FIG. 3 is a schematic diagram showing scheduling signaling and data transmission according to an embodiment of the present disclosure.

As another example, FIG. 3 shows a schematic diagram of scheduling signaling and data transmission. As shown in FIG. 3, a network device transmits uplink resource indication information to a terminal device, i.e., uplink grant (UL grant), for scheduling uplink resources for the terminal device. Here, UL grant 1 and UL grant 2 are used to schedule different uplink resources. Correspondingly, the terminal device uses the uplink resources scheduled by the network device to transmit a Physical Uplink Shared Channel (PUSCH) to the network device. The PUSCH is used to carry uplink data. For example, the data in PUSCH 1 in FIG. 3 may be for an eMBB service, and the data in PUSCH 2 may be for a URLLC service. In addition, as shown in FIG. 3, since the eMBB service transmission is not sensitive to delay requirements, the time interval between UL grant 1 and PUSCH 1 can be relatively large; while the URLLC service transmission is sensitive to delay requirements, and accordingly the time interval between UL grant 2 and PUSCH 2 is relatively small.

However, in the current protocol, terminal devices adopt single-process, sequential processing. That is, a terminal device has to complete processing of one PDSCH/PUSCH before it can process the next PDSCH/PUSCH, so as to avoid cross-scheduling, i.e., to avoid the PDSCH2/PUSCH2 transmission shown in FIG. 2 and FIG. 3. As a result, the URLLC service may not be scheduled or transmitted immediately, which increases the transmission delay of the URLLC service.

Therefore, an embodiment of the present disclosure provides a data transmission method. Since a URLLC service requires immediate scheduling, in order to avoid waiting time that consumes the delay budget, the scheduling of PDSCH 2 in FIG. 2 and the scheduling of PUSCH 2 in FIG. 3 are allowed. In this way, out-of-order data can be processed and the transmission efficiency of the system can be improved.

Figure 4:
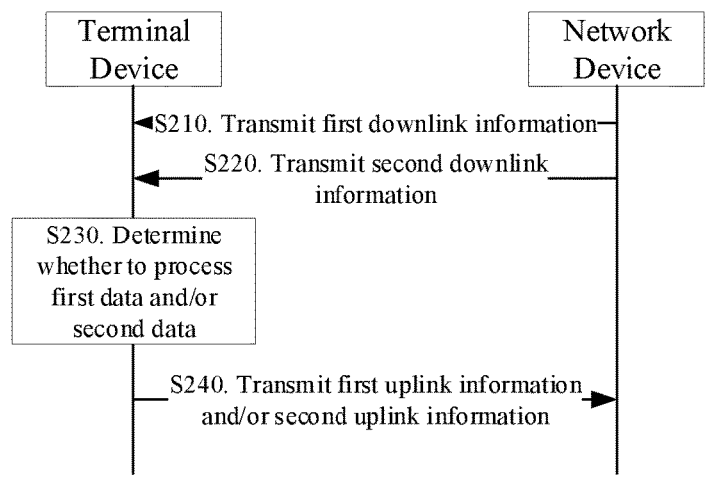
FIG. 4 is a schematic flowchart illustrating a data transmission method according to an embodiment of the present disclosure.

FIG. 4 is a schematic flowchart of a data transmission method 200 according to an embodiment of the present disclosure. The method 200 may be performed by a terminal device and a network device. For example, the terminal device may be the terminal device as shown in FIG. 1, and the network device may be the network device as shown in FIG. 1.

As shown in FIG. 4, the method 200 includes: at S210, transmitting first downlink information. That is, the network device transmits first downlink information to the terminal device. The first downlink information corresponds to first uplink information.

For example, the first downlink information may be first uplink resource indication information, and correspondingly, the first uplink information may be a first PUSCH. Here, the first uplink resource indication information may indicate a resource occupied by the first PUSCH, and the first PUSCH may carry first data.

In another example, alternatively, the first downlink information may be a first PDSCH, and correspondingly, the first uplink information may be a first PUCCH. Here, the first PDSCH may carry first data, and the first PUCCH may carry feedback information for the first data.

As shown in FIG. 4, the method 200 further includes: at S220, transmitting second downlink information. That is, the network device transmits second downlink information to the terminal device. The second downlink information corresponds to second uplink information.

For example, the second downlink information may be second uplink resource indication information, and correspondingly, the second uplink information may be a second PUSCH. Here, the second uplink resource indication information may indicate a resource occupied by the second PUSCH, and the second PUSCH may carry second data.

In another example, alternatively, the second downlink information may be a second PDSCH, and correspondingly, the second uplink information may be a second PUCCH. Here, the second PDSCH may carry second data, and the second PUCCH may carry feedback information for the second data.

Figure 5:
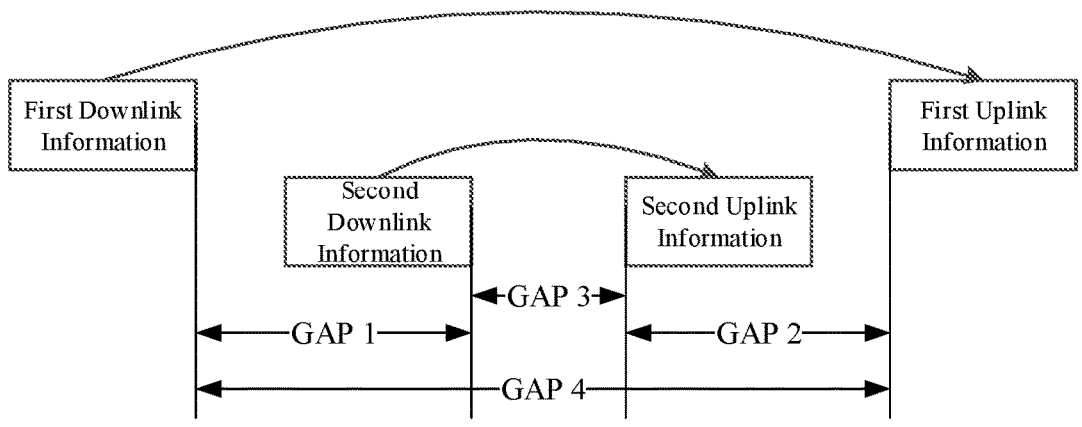
FIG. 5 is a schematic diagram showing time domain positions of various information according to an embodiment of the present disclosure.

It is to be understood that the transmission of the first downlink information and the transmission of the second downlink information by the network device to the terminal device are cross-transmission, or out-of-order transmission of data. That is, a time domain position of the first downlink information is earlier than a time domain position of the second downlink information, and a time domain position of the first uplink information is later than a time domain position of the second uplink information. For example, FIG. 5 is a schematic diagram showing time domain positions of various information in an embodiment of the present disclosure. As shown in FIG. 5, the time domain position of the first downlink information is before the time domain position of the second downlink information, and the time domain position of the first uplink information is after the time domain position of the second uplink information.

Optionally, in an embodiment of the present disclosure, the time domain position of the first downlink information may refer to any time point in the time domain resource occupied by the first downlink information, or in other words, any time point in a process during which the terminal device is receiving the first downlink information. Similarly, the time domain position of the second downlink information may refer to any time point in the time domain resource occupied by the second downlink information, or in other words, any time point in a process during which the terminal device is receiving the second downlink information. For example, the time domain position of the first downlink information may be start time or end time for the terminal device to receive the first downlink information. The time domain position of the second downlink information may be start time or end time for the terminal device to receive the second downlink information. However, the embodiment of the present disclosure is not limited to any of these examples.

Similarly, in an embodiment of the present disclosure, the time domain position of the first uplink information may refer to any time point in the time domain resource occupied by the first uplink information. Similarly, the time domain position of the second uplink information may refer to any time point in the time domain resource occupied by the second uplink information. For example, the time domain position of the first uplink information may be start time or end time of the time domain resource occupied by the first uplink information. The time domain position of the second uplink information may be start time or end time of the time domain resource occupied by the second uplink information. However, the embodiment of the present disclosure is not limited to any of these examples.

In an embodiment of the present disclosure, since each of the time domain position of the first downlink information and the time domain position of the second downlink information may represent any time point, correspondingly, the time domain position of the first downlink information being earlier than the time domain position of the second downlink information may mean that the start time for the terminal device to receive the first downlink information is earlier than the start time for the terminal device to receive the second downlink data, or the end time for the terminal device to receive the first downlink information is earlier than the end time for the terminal device to receive the second downlink data, or the end time for the terminal device to receive the first downlink information is earlier than the start time for the terminal device to receive the second downlink data. However, the embodiment of the present disclosure is not limited to any of these examples.

Similarly, since each of the time domain position of the first uplink information and the time domain position of the second uplink information may represent any time point, correspondingly, the time domain position of the first uplink information being later than the time domain position of the second uplink information may mean that the start position of the time domain resource occupied by the first uplink information is later than the start position of the time domain resource occupied by the second uplink information, or the start position of the time domain resource occupied by the first uplink information is later than the end position of the time domain resource occupied by the second uplink information. However, the embodiment of the present disclosure is not limited to any of these examples.

As shown in FIG. 4, the method 200 further includes: at S230, determining whether to process the first data and/or the second data. That is, the terminal device may determine whether to process the first data corresponding to the first downlink information, and may also determine whether to process the second data corresponding to the second downlink information.

As shown in FIG. 4, the method 200 further includes: at S240, transmitting the first uplink information and/or the second uplink information. That is, the terminal device transmits the first uplink information and/or the second uplink information to the network device according to the processing result in S230.

Since the terminal device receives the second downlink information after receiving the first downlink information and before it needs to transmit the first uplink information to the network device, and the second uplink information scheduled by the second downlink information is earlier than the first uplink information, which forms a cross-transmission or out-of-sequence transmission. Therefore, the terminal device needs to determine whether to process the first data and/or the second data. For example, the terminal device can determine whether to process the first data and/or the second data based on time required for processing the first data and time required for processing the second data. Alternatively, the terminal device can determine whether to process the first data and/or the second data based on a priority of the first data and a priority of the second data. The terminal device can also determine whether to process the first data and/or the second data based further on other conditions. Correspondingly, the terminal device can transmit the corresponding first uplink information and/or second downlink information to the network device based on the processing result(s) of the first data and/or the second data.

The steps S230 and S240 in the method 200 will be described in detail below with reference to two specific embodiments.

Optionally, as a first embodiment, the step S230 in the method 200 may include: determining, by the terminal device, to process the first data and/or the second data based on processing time for the first data and/or processing time for the second data.

For the purpose of illustration, here, several time periods are defined first for the respective time domain positions of the first downlink information, the second downlink information, the first uplink information, and the second uplink information. First, a time interval between the time domain position of the first downlink information and the time domain position of the second downlink information is defined as a first time length. For example, the first time length may specifically be the time interval from the end time of the time domain position occupied by the first downlink information to the end time of the time domain position occupied by the second downlink information, i.e., GAP 1 as shown in FIG. 5. Alternatively, the first time length may be the time interval between the end time of the time domain position occupied by the first downlink information and the start time of the time domain position occupied by the second downlink information, or the time interval between the start time of the time domain position occupied by the first downlink information and the start time of the time domain position occupied by the second downlink information. However, the embodiment of the present disclosure is not limited to any of these examples.

Second, a time interval from the time domain position of the second uplink information to the time domain position of the first uplink information is defined as a second time length. For example, the second time length may specifically be the time interval from the start time of the time domain resource occupied by the second uplink information to the start time of the time domain position occupied by the first uplink information, i.e., GAP 2 as shown in FIG. 5. Alternatively, the second time length may be the time interval between the end time of the time domain resource occupied by the second uplink information and the start time of the time domain position occupied by the first uplink information. However, the embodiment of the present disclosure is not limited to any of these examples.

Third, a time interval from the time domain position of the second downlink information to the time domain position of the second uplink information is defined as a third time length. For example, the third time length may specifically be the time interval between the end time of the time domain resource occupied by the second downlink information and the start time of the time domain resource occupied by the second uplink information, i.e., GAP 3 as shown in FIG. 5. Alternatively, the third time length may be the time interval from the start time of the time domain resource occupied by the second downlink information to the start time of the time domain resource occupied by the second uplink information. However, the embodiment of the present disclosure is not limited to any of these examples.

Fourth, a time interval from the time domain position of the first downlink information to the time domain position of the first uplink information is defined as a fourth time length. For example, the fourth time length may specifically be the time interval between the end time of the time domain resource occupied by the first downlink information and the start time of the time domain resource occupied by the first uplink information, i.e., GAP 4 as shown in FIG. 5. Alternatively, the fourth time length may be the time interval from the start time of the time domain resource occupied by the first downlink information to the start time of the time domain resource occupied by the first uplink information. However, the embodiment of the present disclosure is not limited to any of these examples.

In an embodiment of the present disclosure, the terminal device can determine whether to process the first data and/or the second data based on the first time length to the fourth time length as defined above, the time required for processing the first data, and the time required for processing the second data.

Optionally, the terminal device may determine whether to process the first data based on the first time length and/or the second time length. In particular, if the first time length and/or the second time length are greater than or equal to a first predetermined time length, the terminal device can determine to process the first data, and then transmit the first uplink information to the network device based on the processing result of the first data.

In particular, if the first time length is greater than or equal to the first predetermined time length, the terminal device can process the first data. For example, the terminal device may process the first data within the first time length and transmit the first uplink information to the network device. On the other hand, if the first time length is smaller than the first predetermined time length, the terminal device may determine not to process the first data, or skip or stop processing the first data. Alternatively, the terminal device may determine whether to process the first data according to other conditions. For example, the terminal device may determine whether to process the first data based on to the value of the second time length.

Similarly, if the second time length is greater than or equal to the first predetermined time length, the terminal device can process the first data. For example, the terminal device can process the first data within the second time length and transmit the first uplink information to the network device. On the other hand, if the second time length is smaller than the first predetermined time length, the terminal device may determine not to process the first data, or skip or stop processing the first data. Alternatively, the terminal device may determine whether to process the first data according to other conditions. For example, the terminal device may determine whether to process the first data based on the value of the first time length.

Optionally, if the terminal device determines not to process the first data, the terminal device may not transmit the first uplink information to the network device. Accordingly, the network device does not receive the first uplink information on the corresponding resource. The network device may also use the resource position corresponding to the first uplink information for transmission of other data. Alternatively, when the terminal device determines not to process the first data, the terminal device may also transmit the first uplink information to the network device, and the first uplink information indicates to the network device that the terminal device does not process the first data.

It can be appreciated that, in an embodiment of the present disclosure, the first predetermined time length may include the processing time for the first data, that is, the time required for the terminal device to process the first data. Alternatively, the first predetermined time length may further include conversion time for the terminal device between the first data and the second data. For example, the first predetermined time length may include the conversion time for converting from processing the second data to processing the first data, and/or the conversion time for converting from processing the first data to processing the second data.

In the process of converting from the out-of-order transmission to in-order transmission, or in the process of converting from one data processing to another data processing, there may be processes such as storing intermediate processing results, processing decisions, and switching processes. Therefore, the terminal device needs to take the processing time of the conversion process into consideration. That is, when deciding whether the terminal device can process the out-of-order data, the first predetermined time length needs to include not only the time for processing the data to be processed (i.e., the first data), which is corresponding to a specific processing capability, but also the conversion time. Alternatively, the conversion time can also be directly incorporated in the processing time for the first data. That is, the time required for processing the first data as described above may include the processing time of the terminal device which is corresponding to a specific processing capability, and the conversion time. However, non-ideal factors can be added on the basis of the existing data processing capability. Since the existing processing capability has a certain margin, the conversion time can also be ignored. The embodiment of the present disclosure is not limited to any of these examples.

Figure 6:
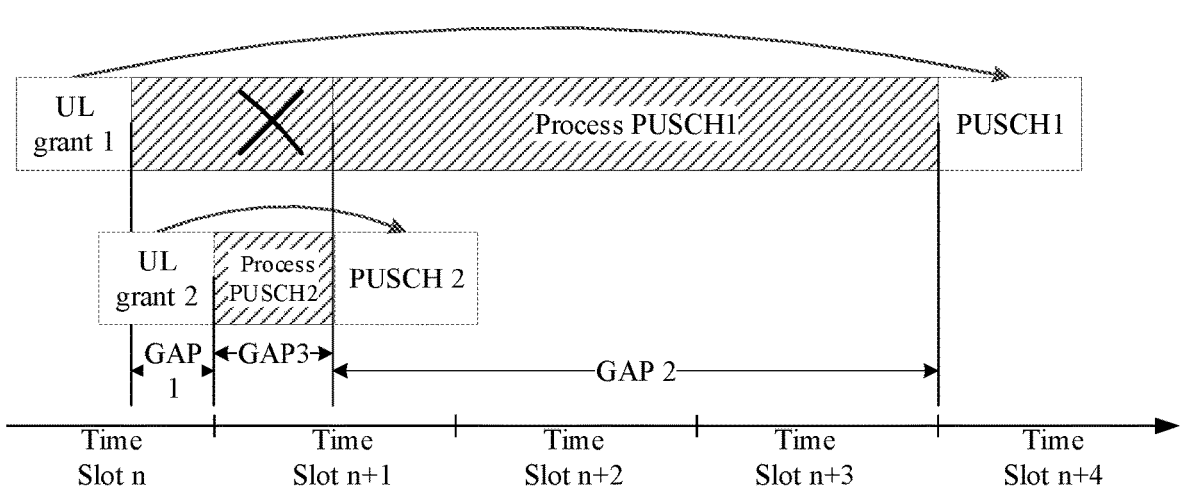
FIG. 6 is another schematic diagram showing scheduling signaling and data transmission according to an embodiment of the present disclosure.

For example, FIG. 6 is a schematic diagram showing scheduling signaling and data transmission in an embodiment of the present disclosure. As shown in FIG. 6, it is assumed that the first downlink information is UL grant 1, and the first uplink information is PUSCH 1 scheduled by UL grant 1; the second downlink information is UL grant 2, and the second uplink information is PUSCH 2 scheduled by UL grant 2. In particular, it is assumed that the terminal device receives UL grant 1 in time slot n, and its scheduled PUSCH 1 is in time slot n+4; the terminal device also receives UL grant 2 in time slot n, and its scheduled PUSCH 2 is in time slot n+1. Here, the time domain position of UL grant 1 is before that of UL grant 2. For example, the end time of the time domain resource occupied by UL grant 1 can be compared with the end time of the time domain resource occupied by UL grant 2, and UL grant 1 is earlier than UL grant 2. PUSCH 2 is before PUSCH 1. For example, the start time of the time domain resource occupied by PUSCH 2 can be compared with the start time of the time domain resource occupied by PUSCH 1, and PUSCH 2 is earlier than PUSCH 1. In addition, it is also assumed that the first predetermined time length is equal to 8 symbols, including 6 symbols as processing time for PUSCH 1 and 2 symbols as conversion time; the second predetermined time length is also 8 symbols, including 6 symbols as processing time for PUSCH 2 and 2 symbols as conversion time.

As shown in FIG. 6, the first time length is GAP 1 in FIG. 6 and is assumed to be 5 symbols, then the first time length is smaller than the processing time of PUSCH 1 (6 symbols), and the terminal device does not process the first data within the first time length. Alternatively, if the terminal device has already started processing the first data within the first time length, it will skip or stop processing the first data after receiving UL grant 2.

In addition, the second time length is GAP 2 in FIG. 6 and is assumed to be 35 symbols. That is, the second time length is longer than the first predetermined time length (8 symbols), then the terminal device determines to process the first data within the second time length, and transmits PUSCH 1 to the network device at the time domain position of PUSCH 1. PUSCH 1 is used to carry the first data.

It can be appreciated that, in FIG. 6, when at least one of the first time length and the second time length is greater than or equal to the first predetermined time length, the terminal device may determine to process the first data. Alternatively, the terminal device may determine whether to process the first data based only on the first time length. In particular, as shown in FIG. 7, similar to FIG. 6, it is also assumed that the terminal device receives UL grant 1 in time slot n, and its scheduled PUSCH 1 is in time slot n+4; the terminal device also receives UL grant 2 in time slot n, and its scheduled PUSCH 2 is in time slot n+1.

Figure 7:
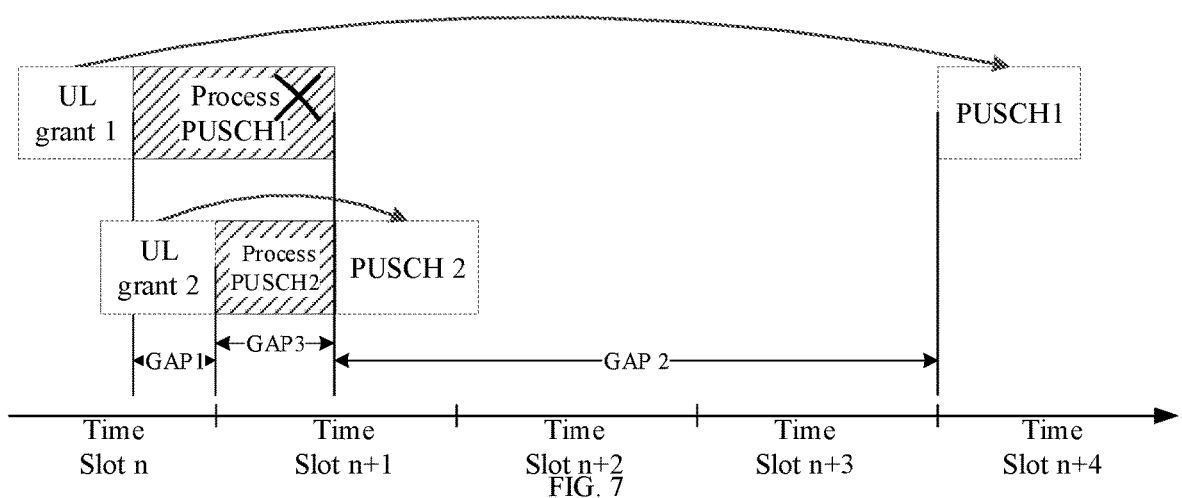
FIG. 7 is yet another schematic diagram showing scheduling signaling and data transmission according to an embodiment of the present disclosure.

As shown in FIG. 7, the first time length is GAP 1 in FIG. 7 and is assumed to be 5 symbols, then the first time length is smaller than the processing time of PUSCH 1 (6 symbols), and the terminal device determines not to process the first data. Alternatively, if the terminal device has already started processing the first data within the first time length, it will skip or stop processing the first data after receiving UL grant 2.

Figure 8:
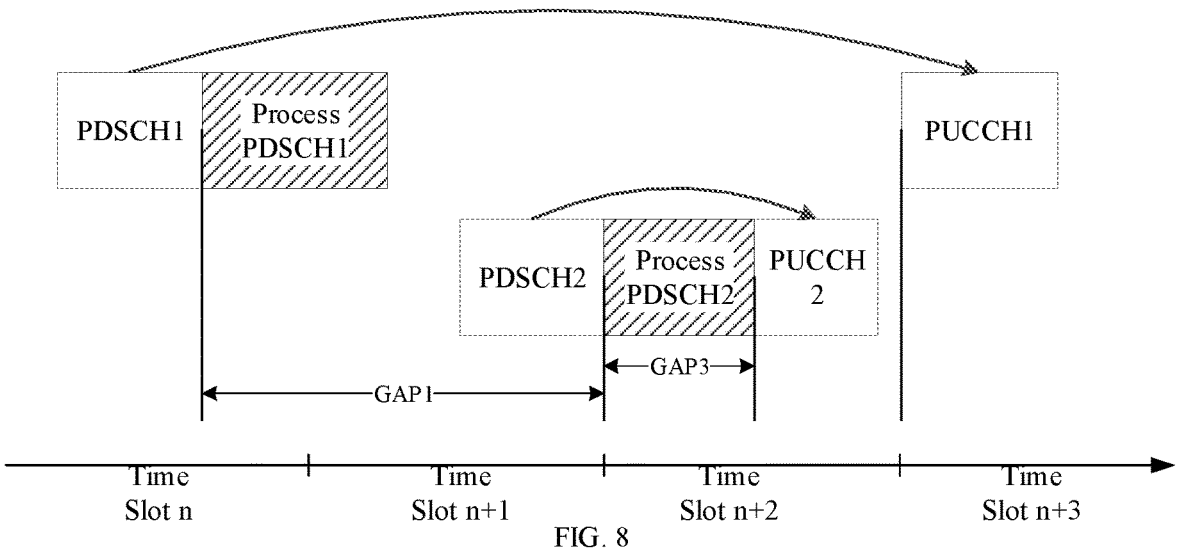
FIG. 8 is a schematic diagram showing data transmission and detection feedback according to an embodiment of the present disclosure.

In another example, FIG. 8 is a schematic diagram showing data transmission and detection feedback in an embodiment of the present disclosure. As shown in FIG. 8, it is assumed that the first downlink information is PDSCH 1, which is used to carry the first data, and accordingly, the first uplink information is PUCCH 1, which includes feedback information for the first data. Similarly, it is assumed that the second downlink information is PDSCH 2, which is used to carry the second data, and accordingly, the second uplink information is PUCCH 2, which includes feedback information for the second data. In particular, it is assumed that the terminal device receives PDSCH 1 in time slot n, and its corresponding PUCCH 1 is in time slot n+3; the terminal device also receives PDSCH 2 in time slot n+1, and its scheduled PUCCH 2 is in time slot n+2. Here, PDSCH 2 is after PDSCH 1. For example, as shown in FIG. 8, the end time of the time domain resource occupied by PDSCH 1 can be compared with the end time of the time domain resource occupied by PDSCH 2. PDSCH 1 is earlier than PDSCH 2. In addition, PUCCH 2 is before PUCCH 1. For example, as shown in FIG. 8, the start time of the time domain resource occupied by PUCCH 1 can be compared with the start time of the time domain resource occupied by PUCCH 2, and PUCCH 1 is later than PUCCH 2. In addition, it is also assumed that the first predetermined time length is equal to 8 symbols, including 6 symbols as processing time for PDSCH 1 and 2 symbols as conversion time; the second predetermined time length is also 8 symbols, including 6 symbols as processing time for PDSCH 2 and 2 symbols as conversion time.

As shown in FIG. 8, the first time length is GAP 1 in FIG. 8 and is assumed to be 8 symbols, which is equal to the first predetermined time length (8 symbols), i.e., greater than the time for processing PDSCH 1 (6 symbols), and the terminal device determines to process the first data within the first time length, and transmits PUCCH 1 to the network device at the time domain position of PUCCH 1. PUCCH 1 is used to feed back a reception status of the first data to the network device.

In an embodiment of the present disclosure, for the second data, the terminal device may determine whether to process the second data based on the third time length. In particular, if the third time length is greater than or equal to a second predetermined time length, the terminal device can process the second data. For example, the terminal device can process the second data within the third time length; and then transmit the second uplink information to the network device based on the processing result of the second data. On the other hand, if the third time length is smaller than the second predetermined time length, the terminal device does not expect such scheduling. That is, the network device should avoid the situation where the third time length is smaller than the second predetermined time length. Alternatively, if the third time length is smaller than the second predetermined time length, the terminal device can determine to skip or stop processing the second data, and do not transmit the second uplink information to the network device. Accordingly, the network device does not receive the second uplink information on the corresponding resource. The network device may further use the resource position corresponding to the second uplink information for the transmission of other data. Alternatively, the second uplink information transmitted by the terminal device to the network device may indicate that the terminal device has not completed processing of the second data.

It can be appreciated that, in an embodiment of the present disclosure, the second predetermined time length may include the processing time for the second data, i.e., the time required for the terminal device to process the second data. Alternatively, the second predetermined time length may further include conversion time for the terminal device to convert from processing the first data to processing the second data. Similar to the first predetermined time length, in the process of converting from the out-of-order transmission to in-order transmission, or in the process of converting from processing the first data to processing the second data, there may be processes such as storing intermediate processing results, processing decisions, and switching processes. Therefore, the terminal device needs to take the processing time of the conversion process into consideration. That is, when deciding whether the terminal device can process the out-of-order data, the second predetermined time length needs to include not only the processing time for the data to be processed (i.e., the second data), but also the conversion time. Alternatively, the conversion time can also be directly incorporated in the processing time for the second data. That is, the time required for processing the second data as described above may include the processing time of the terminal device and the conversion time. However, non-ideal factors can be added on the basis of the existing data processing capability. Since the existing processing capability has a certain margin, the conversion time can also be ignored. The embodiment of the present disclosure is not limited to any of these examples.

For example, referring to FIG. 6 and FIG. 7 again, as shown in FIG. 6 and FIG. 7, the third time length is GAP 3 in FIGS. 6 and 7 and is assumed to be 8 symbols, which is equal to the second predetermined time length, or greater than the time required for processing the second data (6 symbols). Therefore, the terminal device can process the second data within the third time length, and transmit PUSCH 2 to the network device at the time domain position of PUSCH 2. PUSCH 2 is used to carry the second data.

In another example, referring to FIG. 8, the third time length is GAP 3 as shown in FIG. 8 and is assumed to be 8 symbols, which is equal to the second predetermined time length, or greater than the time required for processing the second data (6 symbols). Therefore, the terminal device can process the second data within the third time length, i.e., to receive and parse the data carried by PDSCH 2, and transmit PUCCH 2 to the network device at the time domain position of PUCCH 2. PUCCH 2 is used to feed back a reception status of the second data to the network device.

It can be appreciated that in the case shown in FIG. 8, if the terminal device determines not to process the first data or the second data, the terminal device may not transmit the corresponding PUCCH 1 and/or PUCCH 2 to the network device, or may transmit PUCCH 1 carrying a Negative Acknowledgement (NACK) and PUCCH 2 carrying a NACK. For example, assuming that the first time length is smaller than the first predetermined time length, the terminal device may determine not to process the first data, i.e., not to process PDSCH 1, then the terminal device may not transmit the corresponding PUCCH 1 to the network device, or may transmit PUCCH 1 carrying a NACK to the network device.

It can be appreciated that if the terminal device can support the capability to store intermediate data, serial processing can also be used to solve the problem of out-of-order transmission. In particular, if the fourth time length is greater than or equal to the sum of the first predetermined time length and the second predetermined time length, the terminal device can process the first data and the second data, and transmit the first uplink information and the second uplink information to the network device. That is, the terminal device can start processing the first data when the first downlink information is received, and if the second downlink information is received when the processing of the first data has not been completed, the second data corresponding to the second downlink information can be processed. For the first data that has already been processed partially, the processing of the first data can be suspended, and the processed data can be saved. When the terminal device completes the processing of the second data, it can resume the processing of the first data. Here, it can be ensured that both the first data and the second data can be processed, and correspondingly the first uplink information and the second uplink information can be transmitted to the network device.

On the other hand, if the fourth time length is smaller than the sum of the first predetermined time length and the second predetermined time length, the terminal device can determine to skip or stop processing the first data and/or the second data. For example, the terminal device may determine whether to process the first data or the second data according to other conditions. For example, if the priority of the first data is higher than the priority of the second data, the first data will be processed within the fourth time length. If the priority of the second data is higher than the priority of the first data, the second data will be processed with the fourth time length. However, the embodiment of the present disclosure is not limited to any of these examples.

In addition, in an embodiment of the present disclosure, if the terminal device does not support the above capability to store intermediate data, if the first time length and the second time length are both smaller than the first predetermined time length, the terminal device does not expect such scheduling. That is, the network device should avoid the situation where the first time length and the second time length are both smaller than the first predetermined time length. Alternatively, if the first time length and the second time length are both smaller than the first predetermined time length, the terminal device can determine to skip or stop processing the first data and do not transmit the first uplink information to the network device. Accordingly, the network device does not receive the first uplink information on the corresponding resource. The network device can also use the resource position corresponding to the first uplink information for transmission of other data. Alternatively, the first uplink information transmitted by the terminal device to the network device may also be used to indicate that the terminal device has not completed the processing of the first data.

Therefore, in the first embodiment, according to the time intervals between the first downlink information, the second downlink information, the second uplink information, and the first uplink information, the order in which the first data and/or the second data is processed can be properly arranged, and the out-of-order transmission is treated equivalent to in-order transmission, such that the processing time of the first data and the processing time of the second data have as little impact as possible on each other, which can satisfy the low-latency scheduling requirements without significantly increasing the complexity of the terminal device.

Optionally, as a second embodiment, the step S230 in the method 200 may include: determining, by the terminal device, to process the first data and/or the second data based on a priority of the first data and a priority of the second data.

It is to be understood that the definitions of the first time length to the fourth time length as used in the second embodiment are consistent with those in the first embodiment, and the first predetermined time length and the second predetermined time length in the second embodiment are also consistent with those described in the first embodiment, and details thereof will be omitted here.

Optionally, the terminal device may first determine the priority of the first data and the priority of the second data. For example, the priority of the first data and/or the priority of the second data may be configured by the network device, or may be specified by the protocol, or may be determined by the terminal device based on other conditions. For example, the method 200 may further include: determining, by the terminal device, the priority of the first data based on the first downlink information; and/or determining, by the terminal device, the priority of the second data based on the second downlink information.

For example, if the first downlink information is UL Grant 1 and the second downlink information is UL Grant 2, the priority of the first data and the priority of the second data can be determined based on UL Grant 1 and UL Grant 2, respectively.

In another example, if the first downlink information is PDSCH 1 and the second downlink information is PDSCH 2, the priority of the first data in PUCCH 1 can be determined based on resource indication information for scheduling PDSCH 1, and the priority of the second data in PUCCH 2 can be determined based on resource indication information for scheduling PDSCH 2.

In particular, if the priority of the first data is lower than the priority of the second data, the terminal device can process the second data and transmit the second uplink information to the network device, and accordingly the terminal device may determine to skip or stop processing the first data. Alternatively, the terminal device may further determine whether to process the first data based on other conditions. If the terminal device determines not to process the first data, the terminal device may not transmit the first uplink information to the network device, and accordingly the network device does not receive the first uplink information on the corresponding resource. The network device may also use the resource position corresponding to the first uplink information for transmission of other data. Alternatively, if the terminal device determines not to process the first data, the terminal device may transmit the first uplink information to the network device, and the first uplink information indicates to the network device that the terminal device does not process the first data.

For example, referring to FIG. 7 again, as shown in FIG. 7, it is assumed that the priority of the first data carried by PUSCH 1 is lower than the priority of the second data carried by PUSCH 2, or in other words, the priority of the resource scheduled by UL Grant 1 is lower than the priority of the resource scheduled by UL Grant 2, then the terminal device determines to process the second data. For example, the terminal device can process the second data within the third time length, and transmit PUSCH 2 to the network device at the time domain position of PUSCH 2. The PUSCH 2 is used to carry the second data.

Since the priority of the second data is higher, the terminal device can process the second data within the third time length. Accordingly, the third time length should be greater than or equal to the second predetermined time length. If the third time length is smaller than the second predetermined time length, the terminal device does not expect such scheduling, i.e., the network device should avoid the situation where the third time length is smaller than the second predetermined time length. Alternatively, if the third time length is smaller than the second predetermined time length, the terminal device may determine to skip or stop processing the second data, and do not transmit the second uplink information to the network device, or transmit the second uplink information to the network device, indicating that the terminal device has not completed the processing of the second data.

On the other hand, as shown in FIG. 7, for the first data with the lower priority, the terminal device may determine not to process the first data. Accordingly, the terminal device may not transmit PUSCH 1 to the network device, and the network device will not detect PUSCH 1 at the time domain position of PUSCH 1. In addition, the network device may also use the time domain position of PUSCH 1 for transmission of other data. For example, this part of resource can be allocated to other terminal devices.

Alternatively, for the first data with the lower priority, the terminal device may further determine whether to process the first data based on a first predetermined time length. In particular, since the priority of the second data is higher, the terminal device can process the second data first, or in other words, the terminal device needs to guarantee the processing of the second data. As for the first data, the terminal device may further determine whether to process the first data based on at least one of the first time length, the second time length, and the fourth time length.

It can be appreciated that, the process of determining whether to process the first data based on at least one of the first time length, the second time length, and the fourth time length is similar to that described in the above first embodiment, and details thereof will be omitted here.

For example, the determination as to whether to process the first data based on the first time length and the second time length will be taken as an example. As shown in FIG. 6, it is assumed that the first time length is smaller than the first predetermined time length. That is, the processing of the first data cannot be completed within the first time length. Since the second data has the higher priority, the processing of the second data needs to be completed. After the second data is processed, that is, within the second time length GAP 2, if the second time length is greater than or equal to the first predetermined time length, the terminal device may further process the first data and transmit the first uplink information, i.e., PUSCH 1, to the network device.

In another example, if the first time length is greater than or equal to the first predetermined time length, the terminal device may process the first data within the first time length, that is, to complete the processing of the first data before processing the second data.

Optionally, if the priority of the first data is higher than the priority of the second data, the terminal device can process the first data and transmit the first uplink information to the network device, and accordingly the terminal device may determine to skip or stop processing the second data. Alternatively, the terminal device may further determine whether to process the second data based on other conditions. If the terminal device determines not to process the second data, the terminal device may not transmit the second uplink information to the network device, and accordingly the network device does not receive the second uplink information on the corresponding resource. The network device may also use the resource position corresponding to the second uplink information for transmission of other data. Alternatively, if the terminal device determines not to process the second data, the terminal device may also transmit the second uplink information to the network device, indicating to the network device that the terminal device does not process the second data.

For example, FIG. 8 is a schematic diagram showing data transmission and detection feedback in an embodiment of the present disclosure. As shown in FIG. 8, similar to FIG. 7, it is also assumed that the first downlink information is PDSCH 1, which is used to carry the first data, and correspondingly, the first uplink information is PUCCH 1, which includes feedback information for the first data. Similarly, it is assumed that the second downlink information is PDSCH 2, which is used to carry the second data, and correspondingly, the second uplink information is PUCCH 2, which includes feedback information for the second data. In particular, it is assumed that the terminal device receives PDSCH 1 in time slot n, and its corresponding PUCCH 1 is in time slot n+3; the terminal device also receives PDSCH 2 in time slot n+1, and its scheduled PUCCH 2 is in time slot n+2. Here, PDSCH 2 is after PDSCH 1, and PUCCH 2 is before PUCCH 1. In addition, it is also assumed that the first predetermined time length is equal to 8 symbols, including 6 symbols as processing time for PDSCH 1 and 2 symbols as conversion time; and the second predetermined time length is also 8 symbols, including 6 symbols as processing time for PDSCH 2 and 2 symbols as conversion time.

Figure 9:
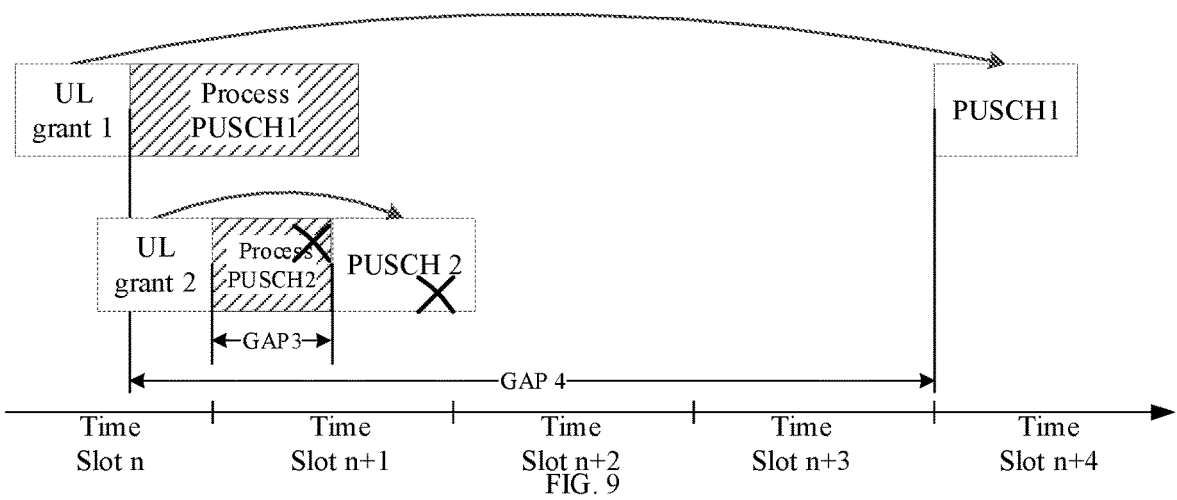
FIG. 9 is another schematic diagram showing scheduling signaling and data transmission according to an embodiment of the present disclosure.

As shown in FIG. 9, it is assumed that the priority of the first data carried by PUSCH 1 is higher than the priority of the second data carried by PUSCH 2, or in other words, the priority of the resource scheduled by UL Grant 1 is higher than the priority of the resource scheduled by UL Grant 2. The terminal device determines to process the first data. For example, the terminal device can, according to the scheduling of UL Grant 1, process the first data within the fourth time length and transmit PUSCH 1, which is used to carry the first data, to the network device at the time domain position of PUSCH 1.

Since the first data has the higher priority, the terminal device can process the first data within the fourth time length. Accordingly, the fourth time length should be greater than or equal to the first predetermined time length. If the fourth time length is smaller than the first predetermined time length, that is, smaller than the time required for the terminal device to process the first data, the terminal device does not expect such scheduling. That is, the network device should avoid the situation where the fourth time length is smaller than the first predetermined time length. Alternatively, if the fourth time length is smaller than the first predetermined time length, the terminal device may determine to skip or stop processing the first data, and do not transmit the first uplink information to the network device, or transmit the first uplink information to the network device, indicating that the terminal device has not completed the processing of the first data.

On the other hand, as shown in FIG. 9, for the second data with the lower priority, the terminal device may determine not to process the second data. Accordingly, the terminal device may not transmit PUSCH 2 to the network device, and the network device will not detect PUSCH 2 at the time domain position of PUSCH 2. In addition, the network device can also use the time domain position of PUSCH 2 for transmission of other data. For example, this part of resource can be allocated to other terminal devices. Alternatively, for the second data with the lower priority, the terminal device may further determine whether to process the second data based on other conditions, for example, according to whether the third time length is greater than, equal to, or smaller than the second predetermined time length.

Therefore, in the second embodiment, the processing order can be selected based on the priority of the data, and the high-priority data can be processed first. The processing flow can be changed from processing the low-priority data to processing the high-priority data, which can satisfy the scheduling requirements of low-latency services.

Therefore, in the data transmission method according to the embodiment of the present disclosure, considering the HARQ-ACK feedback efficiency and system scheduling efficiency, the processing time interval corresponding to some PDSCH/PUSCH is typically much larger than the processing time of the terminal device of a processing capability. For example, there may be typically redundant, idle time within the PDSCH/PDSCH processing interval corresponding to an eMBB service. Thus, other data, such as a delay-sensitive URLLC service, can be processed within the time interval. In particular, the processing of high-priority data can be guaranteed according to the priority of the data, or the processing order can be properly arranged according to the processing time length of the data, so as to satisfy the low-latency scheduling requirements without significantly increasing the complexity of the terminal.

It can be appreciated that in various embodiments of the present disclosure, the values of the sequence numbers of the above processes do not mean the order of execution. The execution order of the processes should be determined by their functions and internal logics. The implementation of the embodiment of the present disclosure is not limited to any specific execution order.

The data transmission methods according to the embodiments of the present disclosure has been described in detail above with reference to FIGS. 1 to 9. A terminal device and a network device according to the embodiments of the present disclosure will be described below in conjunction with FIGS. 10 to 15.

Figure 10:
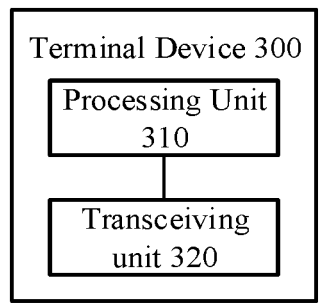
FIG. 10 is a schematic block diagram of a terminal device according to an embodiment of the present disclosure.

As shown in FIG. 10, the terminal device 300 according to the embodiment of the present disclosure includes a processing unit 310 and a transceiving unit 320. In particular, the transceiving unit 320 is configured to: receive first downlink information and second downlink information transmitted by a network device, the first downlink information having a time domain position earlier than a time domain position of the second downlink information, and first uplink information corresponding to the first downlink information having a time domain position later than a time domain position of second uplink information corresponding to the second downlink information. The processing unit 310 is configured to: determine to process first data corresponding to the first downlink information and/or second data corresponding to the second downlink information, and transmit the first uplink information and/or the second uplink information to the network device via the transceiving unit 320 based on a result of the processing.

Optionally, as an embodiment, the processing unit 310 may be configured to: determine to process the first data and/or the second data based on processing time for the first data and/or processing time for the second data.

Optionally, as an embodiment, the processing unit 310 may be configured to perform at least one of: process the first data and transmit the first uplink information to the network device via the transceiving unit 320, when a first time length between the time domain position of the first downlink information and the time domain position of the second downlink information is greater than or equal to a first predetermined time length, the first predetermined time length including the processing time for the first data; process the first data and transmit the first uplink information to the network device via the transceiving unit 320, when a second time length between the time domain position of the second uplink information and the time domain position of the first uplink information is greater than or equal to the first predetermined time length; determine to skip or stop processing the first data, when the first time length is smaller than the first predetermined time length and/or the second time length is smaller than the first predetermined time length; process the second data and transmit the second uplink information to the network device via the transceiving unit 320, when a third time length between the time domain position of the second downlink information and the time domain position of the second uplink information is greater than or equal to a second predetermined time length, the second predetermined time length including the processing time for the second data; determine to skip or stop processing the second data, when the third time length is smaller than the second predetermined time length; process the first data and the second data, and transmit the first uplink information and the second uplink information to the network device via the transceiving unit 320, when a fourth time length between the time domain position of the first downlink information and the time domain position of the first uplink information is greater than or equal to a sum of the first predetermined time length and the second predetermined time length; and determine to skip or stop processing the first data and/or the second data, when the fourth time length is smaller than the sum of the first predetermined time length and the second predetermined time length.

Optionally, as an embodiment, the processing unit 310 is configured to determine to process the first data and/or the second data according to the priority of the first data and the second data.

Optionally, as an embodiment, the processing unit 310 may be further configured to: determine the priority of the first data based on the first downlink information; and/or determine the priority of the second data based on the second downlink information.

Optionally, as an embodiment, the processing unit 310 may be configured to perform at least one of: process the first data and transmit the first uplink information to the network device via the transceiving unit 320, when the priority of the first data is higher than the priority of the second data; determine to skip or stop processing the second data, when the priority of the first data is higher than the priority of the second data; process the second data and transmit the second uplink information to the network device via the transceiving unit 320, when the priority of the first data is lower than the priority of the second data; determine to skip or stop processing the first data, or to process the first data based on processing time for the first data, when the priority of the first data is lower than the priority of the second data.

Optionally, as an embodiment, the processing unit 310 may be further configured to perform at least one of: process the first data and transmit the first uplink information to the network device via the transceiving unit 320, when a first time length between the time domain position of the first downlink information and the time domain position of the second downlink information is greater than or equal to a first predetermined time length, the first predetermined time length including the processing time for the first data; process the first data and transmit the first uplink information to the network device via the transceiving unit 320, when a second time length between the time domain position of the second uplink information and the time domain position of the first uplink information is greater than or equal to the first predetermined time length; determine to skip or stop processing the first data, when the first time length is smaller than the first predetermined time length, and/or the second time length is smaller than the first predetermined time length; and process the first data and the second data, and transmit the first uplink information and the second uplink information to the network device via the transceiving unit 320, when a fourth time length between the time domain position of the first downlink information and the time domain position of the first uplink information is greater than or equal to a sum of the first predetermined time length and a second predetermined time length, the second predetermined time length including processing time for the second data.

Optionally, as an embodiment, the fourth time length between the time domain position of the first downlink information and the time domain position of the first uplink information may be greater than or equal to the first predetermined time length, and the first predetermined time length may include the processing time for the first data; and/or, the third time length between the time domain position of the second downlink information and the time domain position of the second uplink information may be greater than or equal to the second predetermined time length, and the second predetermined time length may include the processing time for the second data.

Optionally, as an embodiment, the first predetermined time length may further include conversion time for the processing unit 310 to convert from processing the second data to processing the first data, and/or conversion time for the processing unit to convert from processing the first data to processing the second data, and/or the second predetermined time length may further include conversion time for the processing unit 310 to convert from processing the first data to processing the second data.

Optionally, as an embodiment, the first downlink information, the second downlink information, the first uplink information, and the second uplink information may satisfy at least one of the following conditions: the time domain position of the first downlink information being start time or end time for the transceiving unit 320 to receive the first downlink information; the time domain position of the second downlink information being start time or end time for the transceiving unit 320 to receive the second downlink information; the time domain position of the first uplink information being start time or end time of a time domain resource occupied by the first uplink information; and the time domain position of the second uplink information being start time or end time of a time domain resource occupied by the second uplink information.

Optionally, as an embodiment, the first time length to the fourth time length may satisfy at least one of the following conditions: the first time length being from end time for the transceiving unit 320 to receive the first downlink information to end time for the transceiving unit 320 to receive the second downlink information; the second time length being from start time of a time domain resource occupied by the second uplink information to start time of a time domain resource occupied by the first uplink information; the third time length being from end time for the transceiving unit 320 to receive the second downlink information to the start time of the time domain resource occupied by the second uplink information; and the fourth time length being from the end time for the transceiving unit 320 to receive the first downlink information to the start time of the time domain resource occupied by the first uplink information.

Optionally, as an embodiment, the first downlink information may be first uplink resource indication information, and the first uplink information may be a first physical uplink shared channel. The first uplink resource indication information may indicate a resource occupied by the first physical uplink shared channel, and the first physical uplink shared channel may carry the first data. The second downlink information may be second uplink resource indication information, and the second uplink information may be a second physical uplink shared channel. The second uplink resource indication information may indicate a resource occupied by the second physical uplink shared channel, and the second physical uplink shared channel may carry the second data.

Optionally, as an embodiment, the first downlink information may be a first physical downlink shared channel, and the first uplink information may be a first physical uplink control channel. The first physical downlink shared channel may carry the first data, and the first physical uplink control channel may carry feedback information for the first data. The second downlink information may be a second physical downlink shared channel, and the second uplink information may be a second physical uplink control channel. The second physical downlink shared channel may carry the second data, and the second physical uplink control channel may carry feedback information for the second data.

It can be appreciated that the above and other operations and/or functions of the respective units in the terminal device 300 according to the embodiment of the present disclosure can implement the corresponding processes performed by the terminal device in the method 200 as shown in FIG. 1 to FIG. 9, and details thereof will be omitted here.

Therefore, in the terminal device according to the embodiment of the present disclosure, considering the HARQ-ACK feedback efficiency and system scheduling efficiency, the processing time interval corresponding to some PDSCH/PUSCH is typically much larger than the processing time of the terminal device of a processing capability. For example, there may be typically redundant, idle time within the PDSCH/PDSCH processing interval corresponding to an eMBB service. Thus, other data, such as a delay-sensitive URLLC service, can be processed within the time interval. In particular, the processing of high-priority data can be guaranteed according to the priority of the data, or the processing order can be properly arranged according to the processing time length of the data, so as to satisfy the low-latency scheduling requirements without significantly increasing the complexity of the terminal.

Figure 11:
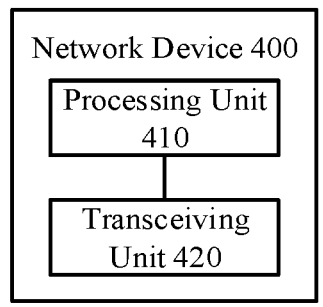
FIG. 11 is a schematic block diagram of a network device according to an embodiment of the present disclosure.

As shown in FIG. 11, the network device 400 according to the embodiment of the present disclosure includes a processing unit 410 and a transceiving unit 420. In particular, the transceiving unit 420 is configured to transmit first downlink information and second downlink information to a terminal device, the first downlink information having a time domain position earlier than a time domain position of the second downlink information, and first uplink information corresponding to the first downlink information having a time domain position later than a time domain position of second uplink information corresponding to the second downlink information. The processing unit 410 is configured to determine whether to receive the first uplink information and/or the second uplink information transmitted by the terminal device via the transceiving unit 420.

Optionally, as an embodiment, the processing unit 410 may be further configured to: determine whether to receive the first uplink information and/or the second uplink information via the transceiving unit 420 based on time for the terminal device to process first data corresponding to the first downlink information and/or time for the terminal device to process second data corresponding to the second downlink information.

Optionally, as an embodiment, the processing unit 410 may be configured to perform at least one of: receive the first uplink information transmitted by the terminal device via the transceiving unit 420, when a first time length between the time domain position of the first downlink information and the time domain position of the second downlink information is greater than or equal to a first predetermined time length, the first predetermined time length including the time for the terminal device to process the first data; receive the first uplink information transmitted by the terminal device via the transceiving unit 420, when a second time length between the time domain position of the second uplink information and the time domain position of the first uplink information is greater than or equal to the first predetermined time length; determine that the terminal device skips or stops processing the first data, and/or determine not to receive the first uplink information at the time domain position of the first uplink information, when the first time length is smaller than the first predetermined time length and/or the second time length is smaller than the first predetermined time length; receive the second uplink information transmitted by the terminal device via the transceiving unit 420, when a third time length between the time domain position of the second downlink information and the time domain position of the second uplink information is greater than or equal to a second predetermined time length, the second predetermined time length including the time for the terminal device to process the second data; determine that the terminal device skips or stops processing the second data, and/or determine not to receive the second uplink information at the time domain position of the second uplink information, when the third time length is smaller than the second predetermined time length; receive the first uplink information and the second uplink information transmitted by the terminal device via the transceiving unit 420, when a fourth time length between the time domain position of the first downlink information and the time domain position of the first uplink information is greater than or equal to a sum of the first predetermined time length and the second predetermined time length; and determine that the terminal device skips or stops processing the first data and/or the second data, when the fourth time length is smaller than the sum of the first predetermined time length and the second predetermined time length.

Optionally, as an embodiment, the processing unit 410 may be further configured to: determine whether to receive the first uplink information and/or the second uplink information via the transceiving unit 420 based on a priority of first data corresponding to the first downlink information and a priority of second data corresponding to the second downlink information.

Optionally, as an embodiment, the first downlink information may indicate the priority of the first data; and/or the second downlink information may indicate the priority of the second data.

Optionally, as an embodiment, the processing unit 410 may be further configured to perform at least one of: receive the first uplink information transmitted by the terminal device via the transceiving unit 420, when the priority of the first data is higher than the priority of the second data; determine that the terminal device skips or stops processing the second data and determine not to receive the second uplink information at the time domain position of the second uplink information, when the priority of the first data is higher than the priority of the second data; receive the second uplink information transmitted by the terminal device via the transceiving unit 420, when the priority of the first data is lower than the priority of the second data; determine that the terminal device skips or stops processing the first data and determine not to receive the first uplink information at the time domain position of the first uplink information, when the priority of the first data is lower than the priority of the second data; and determine whether to receive the first uplink information via the transceiving unit 420 based on time for the terminal device to process the first data, when the priority of the first data is lower than the priority of the second data.

Optionally, as an embodiment, when the priority of the first data is lower than the priority of the second data, the processing unit 410 may be configured to perform at least one of: receive the first uplink information transmitted by the terminal device via the transceiving unit 420, when a first time length between the time domain position of the first downlink information and the time domain position of the second downlink information is greater than or equal to a first predetermined time length, the first predetermined time length including the time for processing the first data; receive the first uplink information transmitted by the terminal device via the transceiving unit 420, when a second time length between the time domain position of the second uplink information and the time domain position of the first uplink information is greater than or equal to the first predetermined time length; determine that the terminal device skips or stops processing the first data and determine not to receive the first uplink information at the time domain position of the first uplink information, when the first time length is smaller than the first predetermined time length and/or the second time length is smaller than the first predetermined time length; and receive the first uplink information and the second uplink information transmitted by the terminal device via the transceiving unit 420, when a fourth time length between the time domain position of the first downlink information and the time domain position of the first uplink information is greater than or equal to a sum of the first predetermined time length and the second predetermined time length, the second predetermined time length including processing time for the second data.

Optionally, as an embodiment, the fourth time length between the time domain position of the first downlink information and the time domain position of the first uplink information may be greater than or equal to the first predetermined time length, and the first predetermined time length may include the time for the terminal device to process the first data; and/or the third time length between the time domain position of the second downlink information and the time domain position of the second uplink information may be greater than or equal to the second predetermined time length, and the second predetermined time length may include the time for the terminal device to process the second data.

Optionally, as an embodiment, the first predetermined time length may further include conversion time for the terminal device to convert from processing the second data to processing the first data and/or conversion time for the terminal device to convert from processing the first data to processing the second data, and/or the second predetermined time length may further include conversion time for the terminal device to convert from processing the first data to processing the second data.

Optionally, as an embodiment, the first downlink information, the second downlink information, the first uplink information, and the second uplink information may satisfy at least one of the following conditions: the time domain position of the first downlink information being start time or end time of a time domain resource occupied by the first downlink information; the time domain position of the second downlink information being start time or end time of a time domain resource occupied by the second downlink information; the time domain position of the first uplink information being start time or end time of a time domain resource occupied by the first uplink information; the time domain position of the second uplink information being start time or end time of a time domain resource occupied by the second uplink information.

Optionally, as an embodiment, the first time length to the fourth time length may satisfy at least one of the following conditions: the first time length being from end time of a time domain resource occupied by the first downlink information to end time of a time domain resource occupied by the second downlink information; the second time length being from start time of a time domain resource occupied by the second uplink information to start time of a time domain resource occupied by the first uplink information; the third time length being from the end time of the time domain resource occupied by the second downlink information to the start time of the time domain resource occupied by the second uplink information; and the fourth time length being from the end time of the time domain resource occupied by the first downlink information to the start time of the time domain resource occupied by the first uplink information.

Optionally, as an embodiment, the first downlink information may be first uplink resource indication information, and the first uplink information may be a first physical uplink shared channel. The first uplink resource indication information may indicate a resource occupied by the first physical uplink shared channel, and the first physical uplink shared channel may carry first data. The second downlink information may be second uplink resource indication information, and the second uplink information may be a second physical uplink shared channel. The second uplink resource indication information may indicate a resource occupied by the second physical uplink shared channel, and the second physical uplink shared channel may carry second data.

Optionally, as an embodiment, the first downlink information may be a first physical downlink shared channel, and the first uplink information may be a first physical uplink control channel. The first physical downlink shared channel may carry the first data, and the first physical uplink control channel may carry feedback information for the first data. The second downlink information may be a second physical downlink shared channel, and the second uplink information may be a second physical uplink control channel. The second physical downlink shared channel may carry the second data, and the second physical uplink control channel may carry feedback information for the second data.

It can be appreciated that the above and other operations and/or functions of the respective units in the network device 400 according to the embodiment of the present disclosure can implement the corresponding processes performed by the network device in the method 200 as shown in FIG. 1 to FIG. 9, and details thereof will be omitted here.

Therefore, in the network device according to the embodiment of the present disclosure, considering the HARQ-ACK feedback efficiency of the terminal device and system scheduling efficiency, the processing time interval corresponding to some PDSCH/PUSCH is typically much larger than the processing time of the terminal device of a processing capability. For example, there may be typically redundant, idle time within the PDSCH/PUSCH processing interval corresponding to an eMBB service. Thus, the terminal device can process other data, such as a delay-sensitive URLLC service, within the time interval. In particular, the network device can configure the terminal device to guarantee the processing of high-priority data according to the priority of the data, or properly arrange the processing order according to the processing time length of the data, so as to satisfy the low-latency scheduling requirements without significantly increasing the complexity of the terminal.

Figure 12:
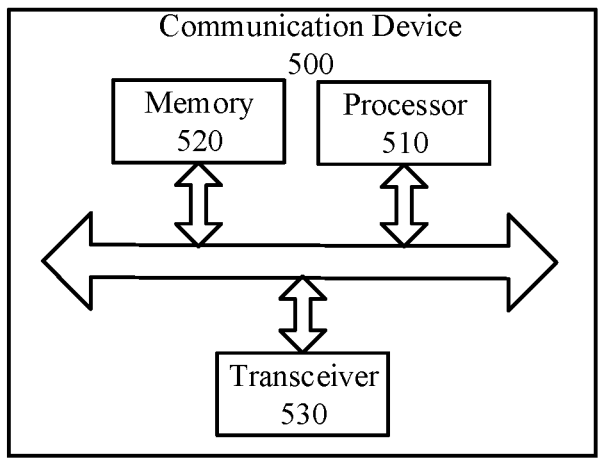
FIG. 12 is a schematic block diagram of a communication device according to an embodiment of the present disclosure.

FIG. 12 is a schematic diagram showing a structure of a communication device 500 according to an embodiment of the present disclosure. The communication device 500 shown in FIG. 12 includes a processor 510, and the processor 510 can invoke and execute a computer program from a memory to perform the method according to any of the embodiments of the present disclosure.

Optionally, as shown in FIG. 12, the communication device 500 may further include a memory 520. The processor 510 can invoke and execute a computer program from the memory 520 to perform the method according to any of the embodiments of the present disclosure.

The memory 520 may be a separate device independent of the processor 510, or may be integrated in the processor 510.

Optionally, as shown in FIG. 12, the communication device 500 may further include a transceiver 530. The processor 510 can control the transceiver 530 to communicate with other devices, and in particular to transmit information or data to other devices or receive information or data transmitted by other devices.

Here, the transceiver 530 may include a transmitter and a receiver. The transceiver 530 may further include one or more antennas.

Optionally, the communication device 500 may be the network device in the embodiment of the present disclosure, and the communication device 500 can perform corresponding procedures implemented by the network device in the method according to any of the embodiments of the present disclosure. Details thereof will be omitted here for simplicity.

Optionally, the communication device 500 may be the mobile terminal/terminal device in the embodiment of the present disclosure, and the communication device 500 can perform corresponding procedures implemented by the mobile terminal/terminal device in the method according to any of the embodiments of the present disclosure. Details thereof will be omitted here for simplicity.

Figure 13:
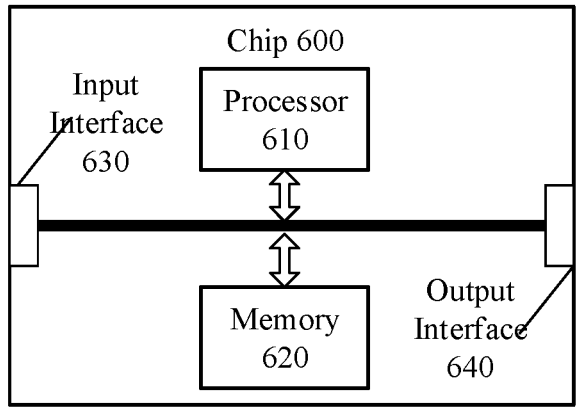
FIG. 13 is a schematic block diagram of a chip according to an embodiment of the present disclosure.

FIG. 13 is a schematic diagram showing a structure of a chip according to an embodiment of the present disclosure. The chip 600 shown in FIG. 13 includes a processor 610, and the processor 610 can invoke and execute a computer program from a memory to implement the method in the embodiment of the present disclosure.

Optionally, as shown in FIG. 13, the chip 600 may further include a memory 620. The processor 610 can invoke and execute a computer program from the memory 620 to implement the method in the embodiment of the present disclosure.

The memory 620 may be a separate device independent from the processor 610, or may be integrated in the processor 610.

Optionally, the chip 600 may further include an input interface 630. The processor 610 can control the input interface 630 to communicate with other devices or chips, and in particular, obtain information or data transmitted by other devices or chips.

Optionally, the chip 600 may further include an output interface 640. The processor 610 can control the output interface 640 to communicate with other devices or chips, and in particular, output information or data to other devices or chips.

Optionally, the chip can be applied to the network device in the embodiment of the present disclosure, and the chip can implement the corresponding processes implemented by the network device in the various methods of the embodiments of the present disclosure. For the sake of brevity, details thereof will be omitted here.

Optionally, the chip can be applied to the mobile terminal/terminal device in the embodiment of the present disclosure, and the chip can implement the corresponding process implemented by the mobile terminal/terminal device in each method of the embodiment of the present disclosure. For the sake of brevity, details thereof will be omitted here.

It can be appreciated that the chip in the embodiment of the present disclosure may also be referred to as a system-level chip, a system-chip, a chip system, a system-on-chip or the like.

Figure 14:
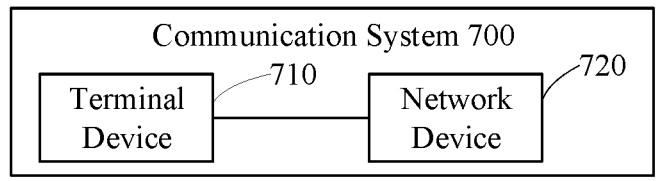
FIG. 14 is a schematic diagram of a communication system according to an embodiment of the present disclosure.

FIG. 14 is a schematic block diagram of a communication system 700 according to an embodiment of the present disclosure. As shown in FIG. 14, the communication system 700 includes a terminal device 710 and a network device 720.

Here, the terminal device 710 can be configured to implement the corresponding functions implemented by the terminal device in the above method, and the network device 720 can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer-readable storage medium for storing a computer program.

Optionally, the computer-readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to cause a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A data transmission method, comprising:
receiving, by a terminal device, first downlink information and second downlink information transmitted by a network device, the first downlink information having a time domain position earlier than a time domain position of the second downlink information, and first uplink information corresponding to the first downlink information having a time domain position later than a time domain position of second uplink information corresponding to the second downlink information; and
determining, by the terminal device, to process first data corresponding to the first downlink information and/or second data corresponding to the second downlink information, and transmitting the first uplink information and/or the second uplink information to the network device based on a result of the processing,
wherein said determining, by the terminal device, to process the first data corresponding to the first downlink information and/or the second data corresponding to the second downlink information comprises: determining, by the terminal device, to process the first data and/or the second data based on processing time for the first data and/or processing time for the second data, and
wherein said determining, by the terminal device, to process the first data corresponding to the first downlink information and/or the second data corresponding to the second downlink information and transmitting the first uplink information and/or the second uplink information to the network device based on the result of the processing comprises at least one of:
processing, by the terminal device, the first data and transmitting the first uplink information to the network device, when a first time length between the time domain position of the first downlink information and the time domain position of the second downlink information is greater than or equal to a first predetermined time length, the first predetermined time length comprising the processing time for the first data;
processing, by the terminal device, the first data and transmitting the first uplink information to the network device, when a second time length between the time domain position of the second uplink information and the time domain position of the first uplink information is greater than or equal to the first predetermined time length;
determining, by the terminal device, to skip or stop processing the first data, when the first time length is smaller than the first predetermined time length and/or the second time length is smaller than the first predetermined time length;
processing, by the terminal device, the second data and transmitting the second uplink information to the network device, when a third time length between the time domain position of the second downlink information and the time domain position of the second uplink information is greater than or equal to a second predetermined time length, the second predetermined time length including the processing time for the second data;
determining, by the terminal device, to skip or stop processing the second data, when the third time length is smaller than the second predetermined time length;
processing, by the terminal device, the first data and the second data, and transmitting the first uplink information and the second uplink information to the network device, when a fourth time length between the time domain position of the first downlink information and the time domain position of the first uplink information is greater than or equal to a sum of the first predetermined time length and the second predetermined time length; and
determining, by the terminal device, to skip or stop processing the first data and/or the second data, when the fourth time length is smaller than the sum of the first predetermined time length and the second predetermined time length.

2. The method according to claim 1, wherein the first predetermined time length further includes conversion time for the terminal device to convert from processing the second data to processing the first data, and/or conversion time for the terminal device to convert from processing the first data to processing the second data, and/or
the second predetermined time length further includes conversion time for the terminal device to convert from processing the first data to processing the second data.

3. The method according to claim 1, wherein the first downlink information, the second downlink information, the first uplink information, and the second uplink information satisfy at least one of the following conditions:
the time domain position of the first downlink information being start time or end time for the terminal device to receive the first downlink information;
the time domain position of the second downlink information being start time or end time for the terminal device to receive the second downlink information;
the time domain position of the first uplink information being start time or end time of a time domain resource occupied by the first uplink information; and
the time domain position of the second uplink information being start time or end time of a time domain resource occupied by the second uplink information.

4. The method according to claim 1, wherein the first time length to the fourth time length satisfy at least one of the following conditions:

the first time length being from end time for the terminal device to receive the first downlink information to end time for the terminal device to receive the second downlink information;

the second time length being from start time of a time domain resource occupied by the second uplink information to start time of a time domain resource occupied by the first uplink information;

the third time length being from end time for the terminal device to receive the second downlink information to the start time of the time domain resource occupied by the second uplink information; and the fourth time length being from the end time for the terminal device to receive the first downlink information to the start time of the time domain resource occupied by the first uplink information.

5. The method according to claim 1, wherein the first downlink information is first uplink resource indication information, and the first uplink information is a first physical uplink shared channel, the first uplink resource indication information indicating a resource occupied by the first physical uplink shared channel, and the first physical uplink shared channel carrying the first data; and the second downlink information is second uplink resource indication information, and the second uplink information is a second physical uplink shared channel, the second uplink resource indication information indicating a resource occupied by the second physical uplink shared channel, and the second physical uplink shared channel carrying the second data; or the first downlink information is a first physical downlink shared channel, and the first uplink information is a first physical uplink control channel, the first physical downlink shared channel carrying the first data, and the first physical uplink control channel carrying feedback information for the first data; and the second downlink information is a second physical downlink shared channel, and the second uplink information is a second physical uplink control channel, the second physical downlink shared channel carrying the second data, and the second physical uplink control channel carrying feedback information for the second data.

6. A data transmission method, comprising:

transmitting, by a network device, first downlink information and second downlink information to a terminal device, the first downlink information having a time domain position earlier than a time domain position of the second downlink information, and first uplink information corresponding to the first downlink information having a time domain position later than a time domain position of second uplink information corresponding to the second downlink information; and determining, by the network device, whether to receive the first uplink information and/or the second uplink information transmitted by the terminal device, wherein said determining, by the network device, whether to receive the first uplink information and/or the second uplink information transmitted by the terminal device comprises: determining, by the network device, whether to receive the first uplink information and/or the second uplink information based on time for the terminal device to process first data corresponding to the first downlink information and/or time for the terminal device to process second data corresponding to the second downlink information, and wherein said determining, by the network device, whether to receive the first uplink information and/or the second uplink information based on the time for the terminal device to process the first data corresponding to the first downlink information and/or the time for the terminal device to process the second data corresponding to the second downlink information comprises at least one of:

receiving, by the network device, the first uplink information transmitted by the terminal device, when a first time length between the time domain position of the first downlink information and the time domain position of the second downlink information is greater than or equal to a first predetermined time length, the first predetermined time length including the time for the terminal device to process the first data;

receiving, by the network device, the first uplink information transmitted by the terminal device, when a second time length between the time domain position of the second uplink information and the time domain position of the first uplink information is greater than or equal to the first predetermined time length;

determining, by the network device, that the terminal device skips or stops processing the first data, and/or determining, by the network device, not to receive the first uplink information at the time domain position of the first uplink information, when the first time length is smaller than the first predetermined time length and/or the second time length is smaller than the first predetermined time length;

receiving, by the network device, the second uplink information transmitted by the terminal device, when a third time length between the time domain position of the second downlink information and the time domain position of the second uplink information is greater than or equal to a second predetermined time length, the second predetermined time length including the time for the terminal device to process the second data;

determining, by the network device, that the terminal device skips or stops processing the second data, and/or determining, by the network device, not to receive the second uplink information at the time domain position of the second uplink information, when the third time length is smaller than the second predetermined time length;

receiving, by the network device, the first uplink information and the second uplink information transmitted by the terminal device, when a fourth time length between the time domain position of the first downlink information and the time domain position of the first uplink information is greater than or equal to a sum of the first predetermined time length and the second predetermined time length; and determining, by the network device, that the terminal device skips or stops processing the first data and/or the second data, when the fourth time length is smaller than the sum of the first predetermined time length and the second predetermined time length.

7. The method according to claim 1, wherein the first predetermined time length further includes conversion time for the terminal device to convert from processing the second data to processing the first data, and/or conversion time for the terminal device to convert from processing the first data to processing the second data, and/or the second predetermined time length further includes conversion time for the terminal device to convert from processing the first data to processing the second data.

8. A terminal device, comprising a processor and a memory, wherein the memory is configured to store a computer program, and the processor is configured to invoke and execute the computer program stored in the memory to enable the terminal device to:
   receive first downlink information and second downlink information transmitted by a network device, the first downlink information having a time domain position earlier than a time domain position of the second downlink information, and first uplink information corresponding to the first downlink information having a time domain position later than a time domain position of second uplink information corresponding to the second downlink information; and
   determine to process first data corresponding to the first downlink information and/or second data corresponding to the second downlink information, and transmitting the first uplink information and/or the second uplink information to the network device based on a result of the processing,
   wherein the processor is further configured to invoke and execute the computer program stored in the memory to enable the terminal device to determine to process the first data and/or the second data based on processing time for the first data and/or processing time for the second data, and
   wherein the processor being configured to invoke and execute the computer program stored in the memory to enable the terminal device to determine to process the first data corresponding to the first downlink information and/or the second data corresponding to the second downlink information and transmit the first uplink information and/or the second uplink information to the network device based on the result of the processing comprises the processor being configured to invoke and execute the computer program stored in the memory to enable the terminal device to perform at least one of:
      processing the first data and transmitting the first uplink information to the network device, when a first time length between the time domain position of the first downlink information and the time domain position of the second downlink information is greater than or equal to a first predetermined time length, the first predetermined time length comprising the processing time for the first data;
      processing the first data and transmitting the first uplink information to the network device, when a second time length between the time domain position of the second uplink information and the time domain position of the first uplink information is greater than or equal to the first predetermined time length;
      determining to skip or stop processing the first data, when the first time length is smaller than the first predetermined time length and/or the second time length is smaller than the first predetermined time length;
      processing the second data and transmitting the second uplink information to the network device, when a third time length between the time domain position of the second downlink information and the time domain position of the second uplink information is greater than or equal to a second predetermined time length, the second predetermined time length including the processing time for the second data;
      determining to skip or stop processing the second data, when the third time length is smaller than the second predetermined time length;
      processing the first data and the second data, and transmitting the first uplink information and the second uplink information to the network device, when a fourth time length between the time domain position of the first downlink information and the time domain position of the first uplink information is greater than or equal to a sum of the first predetermined time length and the second predetermined time length; and
      determining to skip or stop processing the first data and/or the second data, when the fourth time length is smaller than the sum of the first predetermined time length and the second predetermined time length.

9. A network device, comprising a processor and a memory, wherein the memory is configured to store a computer program, and the processor is configured to invoke and execute the computer program stored in the memory to perform the method according to claim 6.

10. The terminal device according to claim 8, wherein the first predetermined time length further includes conversion time for the terminal device to convert from processing the second data to processing the first data, and/or conversion time for the terminal device to convert from processing the first data to processing the second data, and/or
   the second predetermined time length further includes conversion time for the terminal device to convert from processing the first data to processing the second data.

11. The terminal device according to claim 8, wherein the first downlink information, the second downlink information, the first uplink information, and the second uplink information satisfy at least one of the following conditions:
   the time domain position of the first downlink information being start time or end time for the terminal device to receive the first downlink information;
   the time domain position of the second downlink information being start time or end time for the terminal device to receive the second downlink information;
   the time domain position of the first uplink information being start time or end time of a time domain resource occupied by the first uplink information; and
   the time domain position of the second uplink information being start time or end time of a time domain resource occupied by the second uplink information.

12. The terminal device according to claim 8, wherein the first time length to the fourth time length satisfy at least one of the following conditions:
   the first time length being from end time for the terminal device to receive the first downlink information to end time for the terminal device to receive the second downlink information;
   the second time length being from start time of a time domain resource occupied by the second uplink information to start time of a time domain resource occupied by the first uplink information;
   the third time length being from end time for the terminal device to receive the second downlink information to the start time of the time domain resource occupied by the second uplink information; and
   the fourth time length being from the end time for the terminal device to receive the first downlink information to the start time of the time domain resource occupied by the first uplink information.

13. The terminal device according to claim 8, wherein the first downlink information is first uplink resource indication information, and the first uplink information is a first physical uplink shared channel, the first uplink resource indication information indicating a resource occupied by the first physical uplink shared channel, and the first physical uplink shared channel carrying the first data; and the second downlink information is second uplink resource indication information, and the second uplink information is a second physical uplink shared channel, the second uplink resource indication information indicating a resource occupied by the second physical uplink shared channel, and the second physical uplink shared channel carrying the second data; or the first downlink information is a first physical downlink shared channel, and the first uplink information is a first physical uplink control channel, the first physical downlink shared channel carrying the first data, and the first physical uplink control channel carrying feedback information for the first data; and the second downlink information is a second physical downlink shared channel, and the second uplink information is a second physical uplink control channel, the second physical downlink shared channel carrying the second data, and the second physical uplink control channel carrying feedback information for the second data.

14. The network device according to claim 9, wherein the first predetermined time length further includes conversion time for the terminal device to convert from processing the second data to processing the first data, and/or conversion time for the terminal device to convert from processing the first data to processing the second data, and/or the second predetermined time length further includes conversion time for the terminal device to convert from processing the first data to processing the second data.

* * * * *